United States Patent [19]

Martin et al.

[11] Patent Number: 4,771,456
[45] Date of Patent: Sep. 13, 1988

[54] CABLE TELEVISION CHANNEL SELECTOR/DESCRAMBLER FOR USE WITH CABLE-READY VIDEO APPLICANCES

[75] Inventors: Thomas F. Martin, Richardson; John P. Fullingim, Dallas, both of Tex.

[73] Assignee: General Instrument Corporation, New York, N.Y.

[21] Appl. No.: 927,675

[22] Filed: Nov. 6, 1986

[51] Int. Cl.$^4$ ............................................. H04K 1/00
[52] U.S. Cl. ....................................... 380/10; 380/13
[58] Field of Search .................................. 380/10, 13

[56] References Cited

U.S. PATENT DOCUMENTS

| 3,639,686 | 2/1972 | Walker et al. | 380/10 |
| 4,272,791 | 6/1981 | Rifken | 380/13 |
| 4,496,986 | 1/1985 | Lubchenko et al. | 380/13 |
| 4,518,993 | 5/1985 | Okada et al. | 380/13 |
| 4,611,242 | 9/1986 | Williams | 380/13 |

Primary Examiner—Salvatore Cangialosi
Attorney, Agent, or Firm—Kramer, Brufsky & Cifelli

[57] ABSTRACT

A cable television channel selector/descrambler enables the full capabilities of a cable-ready video appliance (e.g., television set or VCR) to be used in conjunction with a cable television system providing unscrambled channels and scrambled premium channels. A broadband cable signal containing a plurality of television signal channels having different frequencies is passed through a filter to produce a modified cable signal having one of the signal channels removed therefrom. The broadband cable signal is input to a tuner for selectively tuning only to scrambled signal channels contained in the broadband cable signal. The tuner is tuned to a scrambled signal channel to be viewed by stepping through the scrambled signal channels accessible by the tuner until the desired signal channel is reached. A scrambled signal tuned by the tuner is descrambled and remodulated to convert it to the frequency of the signal channel removed by the filter in producing the modified cable signal. The re-modulated descrambled signal is combined with the modified cable signal to form a composite signal for input to a video appliance. The composite signal contains all of the original unscrambled channels together with the selected premium channel which has been descrambled.

8 Claims, 1 Drawing Sheet

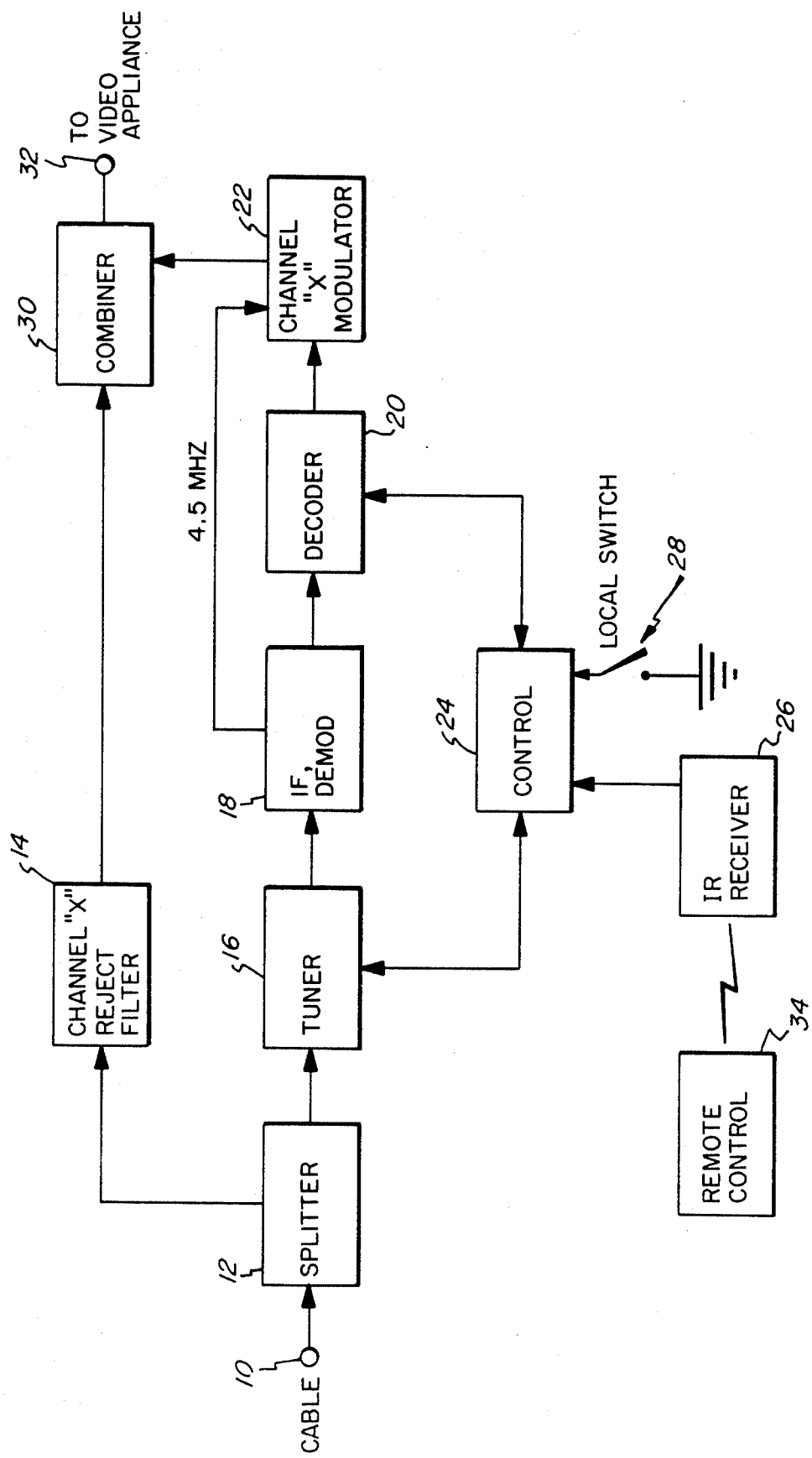

CABLE TELEVISION CHANNEL SELECTOR/DESCRAMBLER FOR USE WITH CABLE-READY VIDEO APPLIANCES

TECHNICAL FIELD

This invention relates to the reception of scrambled cable television programs and more particularly, to a channel selector/descrambler apparatus and method for utilizing the full capabilities of a cable-ready video appliance in conjunction with a cable television system providing unscrambled channels and scrambled premium channels.

BACKGROUND OF THE INVENTION

In cable television systems, it is conventional to transmit a broadband radio frequency ("RF") signal along a cable for delivery of programming to a consumer's home. The broadband RF signal contains a number of signal channels to which a user can tune to view different programs. A typical cable system provides 30-45 channels, although some systems provide fewer than 20 channels and others provide more than 70 different channels. In order to tune to the different channels carried by the cable, users are provided with cable television converters which are connected between the cable coming into the user's home or office and the user's television set. Sometimes, a user will connect the converter to a video recorder which can record and play back programs on his television set. The use of the cable television converter has usually required the user to tune to desired programs using the converter instead of the tuner built into his television set or video recorder.

Video appliances (e.g., televisions and video recorders) which are "cable-ready" have been available for several years and their population is rapidly increasing. These cable-ready products are capable of directly tuning cable channels without the need for a converter, but are not able to descramble premium channels which only authorized subscribers are permitted to receive. Thus, a cable television descrambler, which is usually part of the cable television converter, is still required in order to view scrambled premium channels. The advantages of cable-ready video appliances are therefore often not able to be utilized, since a converter/descrambler must still be placed between the cable and the user's television set or recorder.

Many of the cable-ready video appliances have remote control features that are very appealing to the user. Such features include channel scan, volume, mute, favorite channel programming, picture-in-a-picture, etc. A cable television converter renders many of these features inoperable, and requires the user to use the remote control unit supplied with the converter, for which he may be charged a rental fee. Since the video appliance must remain tuned to the output channel of the converter (typically, channel 2, 3, or 4), the remote control for the video appliance become useless except for features such as on/off, mute, and volume control. Even for these features, the user must still deal with the separate remote control units for both the video appliance and the cable television converter.

Another problem caused by placing a cable television converter in series with the cable and the video appliance is the difficulty of using a video recorder to record one channel while simultaneously watching another on the user's television set. Elaborate cabling schemes using splitters and switches can ease this problem, but these are often complex and difficult for the user to set up.

It would be advantageous to provide an apparatus and method for utilizing the full capabilities of a cable-ready video appliance in conjunction with a cable television system providing unscrambled channels and scrambled premium channels. In such a system, a user should be able to connect a video appliance to the cable exactly as he would if he had an antenna rather than cable. In such an instance, the built-in switching capability in every video recorder would allow a user to record one channel while watching another, without added complexity. All of the cable-ready features of any video appliance would be fully usable.

The present invention provides such an apparatus and method.

SUMMARY OF THE INVENTION

In accordance with the present invention, a cable television channel selector/descrambler is provided for use with a cable-ready video appliance such as a television or video recorder. Signal splitter means split a broadband input signal into first and second signals each containing a plurality of signal channels. Channel reject filter means are coupled to receive the first signal and to filter a predetermined channel therefrom. Tuner means are coupled to receive the second signal and selectively tune to each of a plurality of scrambled channels comprising a subset of all the signal channels contained in the second signal. Control means are coupled to the tuner means and enable a user to increment the tuner means and step through the subset of scrambled channels to select a channel for viewing. Descrambler means, coupled to receive signals output from the tuner means, descramble a channel selected for viewing. Modulator means receive and convert a channel selected for viewing to the channel frequency of the predetermined channel which was filtered from the first signal by the channel reject filter means. Combiner means then combine the filtered first signal from the channel reject filter means with the descrambled and converted channel selected for viewing. Means are provided for coupling the combined signals from the combiner means to a cable-ready video appliance.

The control means of the channel selector/descrambler can comprise a single switch for enabling a user to step through the subset of scrambled channels and thereby select one of those channels for viewing. An indication of a channel selected in this manner can be provided as either an on-screen channel display on the user's television or a readout on the channel selector/descrambler itself. The single switch which the user uses to step through the subset of channels can be a button (or combination of buttons) on a remote control. The remote control can be the remote unit provided with the cable-ready video appliance to which the channel selector/descrambler is connected. In this instance, means are provided for programming the control means of the channel selector/descrambler to respond to signals received from the remote control unit.

In accordance with the method of the present invention, a broadband cable signal containing a plurality of television signal channels having different frequencies is passed through a filter to produce a modified cable signal having one of the signal channels removed therefrom. The broadband cable signal is also input to a tuner for selectively tuning to scrambled signal channels contained in the broadband cable signal. A scrambled signal channel tuned by the tuner is input to a descrambler to produce a descrambled signal. The descrambled signal is then re-modulated to convert it to the frequency of the signal channel removed by the filter in producing the modified cable signal. The re-modulated, descrambled signal is combined with the modified cable signal to form a composite signal for input to a video appliance. In order to view a desired premium (i.e., scrambled) channel, the tuner is tuned to a scrambled signal channel by stepping through the scrambled signal channels accessible by the tuner until the desired signal channel is reached.

The channel selector/descrambler of the present invention can also be used for multiple dwelling unit ("MDU") applications. The objective in an MDU application is to keep the cost of the hardware in the cable television subscriber's home to a minimum, while offering the ability to view one or more premium channels as well as basic channels. As noted above, the display of indicia identifying a premium channel selected for viewing can be placed on the user's television screen, by known techniques. The control signal which enables a user to increment the tuner means and step through the subset of scrambled channels can be sent from the user's home to a remotely located channel selector/descrambler. The control signal would change the premium channel tuned, as described above, and the premium channel number would be displayed on the customer's television.

In the MDU situation, the control signal is passed back to the remotely located channel selector/descrambler over the same cable that connects the output of the channel selector/descrambler to the television set or other video appliance. Thus, the need for additional control cables is eliminated. The signaling device in the user's home could be either a simple switch closure or a remote control receiver which derives its power from the channel selector/descrambler, again through the cable connecting the channel selector/descrambler to the video appliance.

In the MDU configuration, a plurality of channel selector/descrambler units can be centrally located without decorative cases and powered by a shared power supply to reduce costs. The same concept can be used in an off-premise configuration, wherein the channel selector/descrambler unit is mounted outside a house, for example under an eave or on a utility pole.

BRIEF DESCRIPTION OF THE DRAWING

The drawing is a block diagram illustrating a channel selector/descrambler in accordance with the present invention.

DETAILED DESCRIPTION OF THE INVENTION

The present invention is best described by referring to the figure, which shows a channel selector/descrambler in block diagram form. A signal from a cable television drop is input to terminal 10 of the channel selector/descrambler. The cable carries a broadband RF signal which typically includes a number of non-scrambled (non-premium) channels and a smaller number of scrambled (premium) channels which the customer pays an additional fee to receive. At least one of the channels on the cable drop is left free and carries no signal. This channel is referred to herein as channel "X". For example, channel "X" may be television channel 17.

The signal input from the cable drop is split by a splitter 12 into two paths, one of which is routed through a channel "X" reject filter 14 to a combiner 30. Reject filter 14 and combiner 30 are conventional circuits formed from passive components, although active filter means can be used for reject filter 14 as will be appreciated by those skilled in the art.

The other path from splitter 12 inputs the cable drop signal into a tuner 16 which enables a user to tune to a desired premium channel for descrambling and viewing. Tuner 16 may tune the full spectrum of channels present on the cable drop, but is preferably limited in range to those channels which the cable system operator uses for premium (scrambled) channels. Using a limited range tuner not only reduces the cost of the channel selector/descrambler of the present invention, but also facilitates the selection of a premium channel for viewing as will be described below.

In a preferred embodiment, tuner 16 is a "midband" tuner which is limited to tuning cable television channels 14 through 22 (known as the midband channels). If channel 17 is used as channel "X", it will not be present on the cable drop and the tuner will have access to eight channels, namely channels 14 to 16 and 18 to 22. As already noted, these eight channels would be those that the cable operator would use to transmit premium programming.

The output of tuner 16 is input to an intermediate frequency (IF) and demodulator stage 18 for standard processing of a tuned signal. The tuned processed signal is then input to decoder 20 for descrambling. Any known method of descrambling the premium channels can be used in connection with the present invention. The descrambled signal is re-modulated at channel "X" modulator 22 to the frequency of channel "X" (e.g., channel 17). The descrambled premium signal then present on channel "X" is combined by combiner 30 with the rest of the broadband cable signal output from channel "X" reject filter 14. Combiner 30 produces a composite cable signal that includes all of the original channels from the cable drop together with the descrambled premium channel on channel "X". The output of combiner 30 is present at terminal 32 through which the signal is connected to a video appliance such as a cable-ready television or video recorder.

Channel "X" reject filter 14 is designed to prevent the output of channel "X" modulator 22 from leaking back onto the cable system. It also serves to clean off any residual noise on the cable drop at channel "X", thereby providing a clean channel for insertion of the premium program re-modulated by channel "X" modulator 22.

Channel "X" modulator 22 must be frequency agile, tuning channel "X" either on the standard broadcast carrier frequency or on the slightly lower frequency often used in cable television systems and known as the harmonically related carrier ("HRC") frequency. If the cable system transmits using the standard frequency scheme, then channel "X" modulator 22 would be set to standard mode. If the cable system uses HRC, channel "X" modulator 22 will be set to that mode. This will ensure that the user's cable-ready television or other video appliance will have no difficulty tuning to the premium channel (channel "X"). Some cable-ready video appliances have a switch to set their tuning format to either standard or HRC. By enabling channel "X" modulator 22 to accommodate both formats, the user will not have to change the standard/HRC switch on his video appliance when changing from a non-premium to a premium channel.

The tuner and descrambler section of the channel selector/descrambler (i.e., tuner 16, IF and demodulator stage 18, decoder 20) is controlled by control circuitry 24 which enables a user to step through the channels tunable by tuner 16 one at a time via a local switch 28 or a remote control 34 which actuates an infrared ("IR") receiver 26. Those skilled in the art will appreciate that different types of remote control actuation, such as ultrasonic or RF signaling, can alternately be used.

A cable system customer may be authorized for one premium channel or more than one. If he is authorized for more than one, he would select the desired premium channel by pressing switch 28, or by using remote control 34 which can be designed to require only a single key actuation. This action will increment the channel tuned by tuner 16 until the desired premium channel is selected. An indication of the premium channel tuned can be either displayed on the user's television screen or on a readout (e.g., LED display) on the channel selector/descrambler itself. Once the customer has selected a premium channel for viewing, he simply tunes his television or video recorder to channel "X" (e.g., channel 17) to watch that program. If he wants to watch a non-premium channel (i.e., one that is not scrambled), he simply tunes to that channel on his cable-ready television or video recorder using its own remote control. This approach is advantageous in that the customer typically spends a majority of viewing time on non-premium channels. Further, many customers subscribe to only a single premium channel and will leave the channel selector/descrambler set to the one premium channel so that they will never have to change the channel to which tuner 16 is tuned. To view the single premium channel, the customer need only tune his television or video recorder to channel "X".

A video recorder, if used, would be connected in series between the output of the channel selector/descrambler of the present invention and the user's television set. This is the configuration in which video recorders are designed to be used. Both the video recorder and television set will have full access to all non-premium channels and the premium channel selected using the channel selector/descrambler of the present invention. By using the "TV/VCR" switch provided in all video recorders, the customer can watch one channel while recording another. The only limitation present is that one pay channel cannot be recorded while a different pay channel is simultaneously being watched. Such an arrangement could only be achieved by using a second descrambling unit.

The user interface with the channel selector/descrambler of the present invention can be further simplified by enabling a user to select premium channels using the same remote control unit provided with his television set or other video appliance. This can be accomplished by programming control section 24 to respond to signals received from the user's remote control unit. For example, if channel 17 is used for channel "X", control section 24 would be programmed to "learn" the signal output from the user's remote control when channel 17 is selected on the remote control. This would be accomplished by placing the control circuitry 24 into a learn mode and entering channel 17 into the user's remote control while pointing the infrared emitter of the remote control unit at IR receiver 26. Control section 24 will then recognize the channel 17 signal from the user's remote control as the "switch" which increments tuner 16 to the next channel. Data indicative of the channel 17 signal emitted from the remote control are stored in memory within control section 24 so the signal can be detected each time it occurs. The user can then step through the premium channels tunable by tuner 16 by repeatedly entering channel 17 on his remote control.

In order to avoid the need for a user to step through all of the channels tunable by tuner 16 when he only subscribes to a few of those channels, an authorized channel list can be loaded into the control section 24 of the channel selector/descrambler by the cable system operator. Thus, a customer subscribing to only two premium channels, for example, would not have to step through all eight (or more) possible premium channels. The authorized channel list could be transmitted to control section 24 via conventional data tagging techniques well known in the cable television industry. Such data can be loaded to individual channel selector/descramblers by addressing the individual units with unique address codes. With this code, data can be embedded in the video signal ("in-band") or on a separate RF carrier ("out of band") as will be appreciated by those skilled in the art. Alternately, the channel selector/descrambler of the present invention can include a plurality of tuners, descramblers and re-modulators (e.g., channel "X", channel "Y", and channel "Z" remodulators) so that a plurality of premium channels can be descrambled and output on different television signal channels for input to a cable-ready video appliance. In this manner, the user will be able to watch the premium channels he subscribes to without any need to interact with the channel selector/descrambler unit. He would merely tune his cableready video appliance to the channel (e.g., channel "X", "Y", or "Z") on which the program he wishes to view is output from the channel selector/descrambler. Digital authorization codes can be transmitted from the cable system head-end to instruct each of the multiple tuners in the channel selector/descramblers to tune to specific channels, depending on which channels the user is authorized to receive.

An additional application for the channel selector/descrambler of the present invention is its applicability to multiple dwelling unit (MDU) service, e.g., in condos, apartments, etc. The objective in such an application is to keep the cost of the hardware in the subscriber's home to a minimum, while offering the ability to view one or more pay channels as well as basic channels. The channel selector/descrambler of the present invention lends itself to this application very well. When the display of a premium channel selected is presented on the user's television screen rather than on the channel selector/descrambler unit itself, there is no need to have the channel selector/descrambler at the user's premises. The control signal for stepping through premium channels tuned by tuner 16 can be sent from the subscriber's home to a remotely located channel selector/descrambler over the same cable which connects the user's video appliance to the remote channel selector/descrambler. The control signal sent by the user would change the premium channel tuned as described above, and the selected premium channel number would be displayed on the user's television set. The signaling device in the user's home could be either a simple switch closure to ground or a remote control receiver which could derive its power from the channel selector/descrambler unit, again through the cable connecting this unit to the television set.

The user in the MDU would have available all non-scrambled channels as well as the selected premium channel. He could route these signals to multiple television sets or other video appliances as described above.

In the MDU configuration, the channel selector/descramblers could be the same as used in the normal home installation, where they might be racked together without decorative cases, and powered by a shared power supply to reduce costs. Such a rack arrangement could hold any number of channel selector/descrambler units, and provide signal splitting from the main cable drop input to the multiple channel selector/descrambler inputs. The same concept could be used in an off-premise device, wherein the channel selector/descrambler is mounted outside a house. For example, such a unit could be mounted under an eave or on a utility pole.

We claim:

1. A cable television channel selector/descrambler for use with a cable-ready video appliance having a first means for tuning video signals supplied to said video appliance, said channel selector/descrambler comprising:

signal splitter means splitting a broadband input signal into first and second signals each containing a plurality of signal channels;

second means, separate from the first tuning means and coupled to receive said second signal, for selectively tuning said second signal to each of a plurality of scrambled channels comprising a subset of all the signal channels contained in said signal;

control means coupled to the second tuning means for enabling a user to step the second tuning means through said subset of channels to select a channel for viewing;

descrambler means, coupled to receive signals output from said second tuning means, for descrambling a channel selected for viewing;

modulator means for receiving a channel selected for viewing and converting it to the channel frequency of a predetermined channel;

combiner means for combining the first signal from said signal splitter means with the descrambled and converted channel selected for viewing; and means for supplying the combined signals from said combiner means to said cable-ready video appliance, and wherein:

said control means is responsive to first signals corresponding to said predetermined channel and produced by a remote control to step said second tuning means through a plurality of said scrambled channels by a repetition of said first signals, said remote control being actuated to produce said first signals by a switch located on said remote control, said remote control also controlling said cable-ready video appliance, and said first tuning means being responsive to other signals produced by said remote control to tune channels other than said predetermined channel.

2. The channel selector/descrambler of claim 1 further comprising means for programming said control means to respond to said first signals received from said remote control.

3. The channel selector/descrambler of claim 1 wherein said control means comprises said remote control.

4. The channel selector/descrambler of claim 1 further comprising:

means for displaying indicia identifying a scrambled channel selected for viewing.

5. The channel selector/descrambler of claim 1 further comprising:

channel reject filter means, coupled to receive said first signal, for filtering said predetermined channel from said first signal and coupling said filtered first signal to said combiner means for combining with the descrambled and converted channel selected for viewing.

6. The channel selector/descrambler of claim 1 further comprising:

a plurality of auxiliary tuner means for tuning to different scrambled channels;

a plurality of auxiliary descrambler means, each coupled to a different one of said auxiliary tuner means, for descrambling the different scrambled channels to which the auxiliary tuner means are tuned; and a plurality of auxiliary modulator means, each coupled to a different one of said auxiliary descrambler means, for receiving descrambled channels and converting them to different channel frequencies for combination with said first signal.

7. A method for utilizing the full capabilities of a cable-ready video appliance in conjunction with a cable television system providing unscrambled non-premium channels and scrambled premium channels in a broadband cable signal, said video appliance having a first tuner for tuning video signals supplied to said video appliance, said method comprising the steps of:

inputting said broadband cable signal to a second tuner to selectively tune to said scrambled signal channels contained in the broadband cable signal;

programming said second tuner to respond to a repetition of first signals transmitted by a remote control to step through said scrambled channels, said first signals corresponding to an unused signal channel in said broadband cable signal;

stepping said second tuner through said scrambled signal channels with said remote control by transmitting a repetition of said first signals until a desired scrambled signal channel is reached;

inputting the desired scrambled signal channel tuned by said second tuner to a descrambler to produce a descrambled signal;

re-modulating the descrambled signal to convert it to the frequency of said unused signal channel provided in said broadband cable signal;

combining the re-modulated descrambled signal with said broadband cable signal to form a composite signal and supplying said composite signal to said video appliance; and tuning said first tuner with said remote control to desired channels other than said unused signal channel in said broadband cable signal by transmitting other signals corresponding to said other channels.

8. The method of claim 7 comprising the further step of displaying indicia identifying the scrambled signal channels as the second tuner steps through them.

* * * * *

UNITED STATES PATENT AND TRADEMARK OFFICE
CERTIFICATE OF CORRECTION

PATENT NO. : 4,771,456

DATED : September 13, 1988

INVENTOR(S) : Martin, et al.

It is certified that error appears in the above-identified patent and that said Letters Patent is hereby corrected as shown below:

On the title page:

The last word of the title should read -- APPLIANCES -- instead of "APPLICANCES".

Claim 1, line 6, insert -- for -- after "means".

Signed and Sealed this

Thirty-first Day of July, 1990

Attest:

HARRY F. MANBECK, JR.

*Attesting Officer*　　*Commissioner of Patents and Trademarks*